United States Patent [19]
Oesterritter et al.

[11] 4,184,516
[45] Jan. 22, 1980

[54] PIPE CAP

[76] Inventors: Richard B. Oesterritter, 129 S. Bayly Ave., Louisville, Ky. 40206; Edward M. Steutermann, 13305 Laurel Ct., Prospect, Ky. 40218

[21] Appl. No.: 908,504

[22] Filed: May 22, 1978

[51] Int. Cl.$^2$ ............................................. B65D 59/06
[52] U.S. Cl. ................................................... 138/96 R
[58] Field of Search ................. 138/96 R, 96 T; 16/2, 16/108; 220/300, 315, 266

[56] References Cited

U.S. PATENT DOCUMENTS

| | | | |
|---|---|---|---|
| 1,712,232 | 5/1929 | Rothfus | 138/96 R |
| 2,805,795 | 9/1957 | Barnes | 220/300 |
| 3,283,717 | 11/1966 | Balch | 220/300 |
| 3,612,339 | 10/1971 | Jorgensen | 220/315 |

*Primary Examiner*—Lenard A. Footland

*Attorney, Agent, or Firm*—Edward M. Steutermann

[57] ABSTRACT

A security cap to be attached to a union nut of a piping union where the union nut is provided with at least one radially outwardly extending post where the security cap includes: a cylinder of friable material of selected wall thickness defining an internal chamber of selected diameter at least as great as the diameter of the union nut having an opening defined by an open end of the cylinder and adapted to receive the union nut where cover means are provided to cover the end of the cylinder opposite the opening; and elongate slot means cut in the cylinder sidewall means where the slot means extend from the open end of the cylinder and at an oblique angle relative to a line drawn parallel to the longitudinal axis of the cylinder where the slot is adapted to receive the union nut post to retain the union nut within the chamber defined by the cylinder; and means to retain the union nut within the chamber.

8 Claims, 3 Drawing Figures

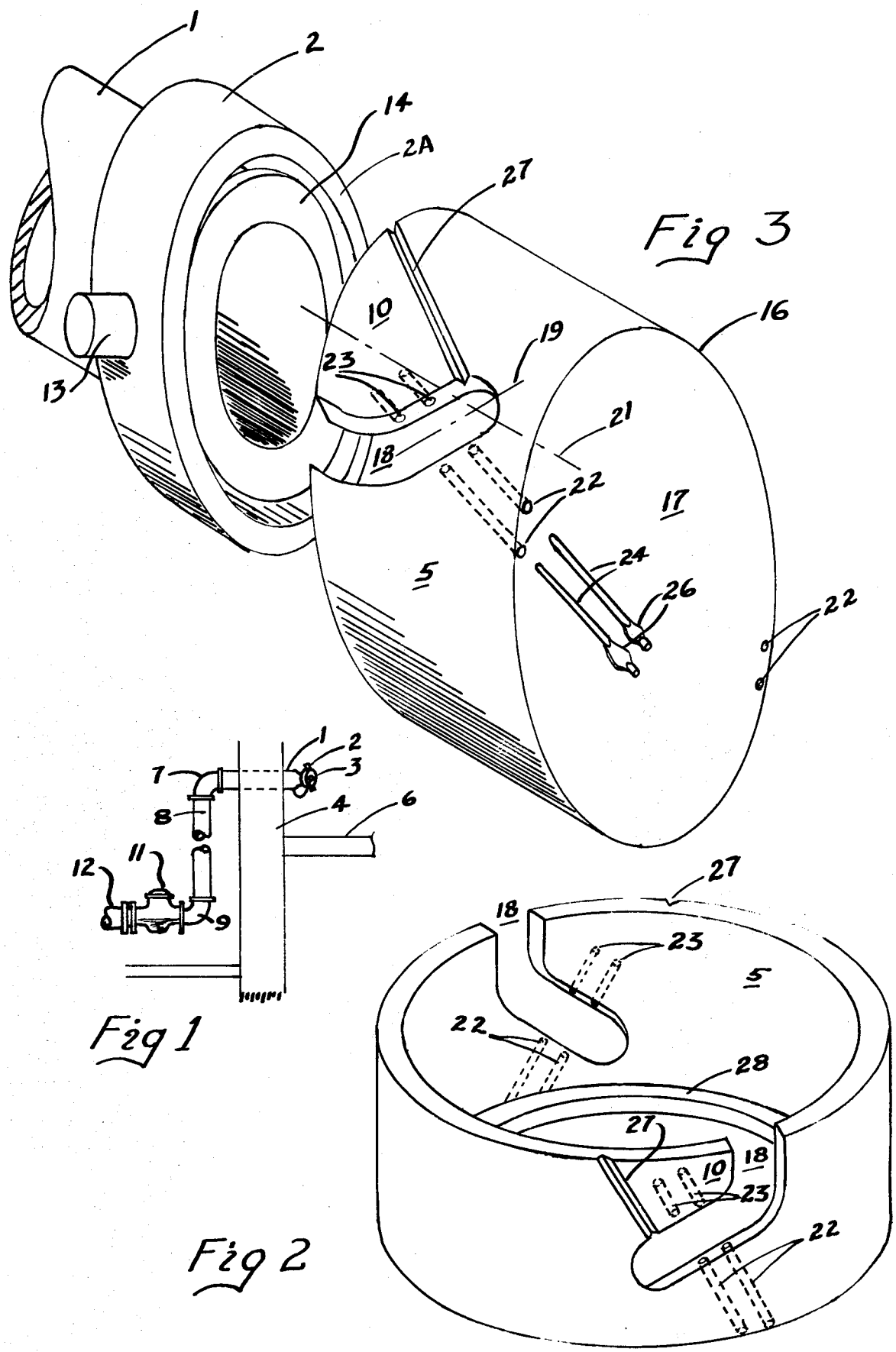

PIPE CAP

BACKGROUND OF THE INVENTION

The present invention provides an essentially tamperproof security cap for use with a pipe union and particularly to provide a cover for the union nut associated with the union where the union nut is not in use or connected to an associate fitting.

More particularly, in certain fire protection systems which include sprinkler systems with multiple sprinkler heads in a building and adapted to be actuated automatically in response to a fire or extreme heat the actuation of several sprinkler heads causes a loss of pressure with resulting loss of coverage area of individual sprinklers heads since the area of coverage is directly dependent on the pressure of the water supply. Water supply systems for sprinklers are maintained either in a water full of dry condition but in any event operate from available water main pressure and supply which in most instances is not sufficient to maintain optimum operating pressure when there are several sprinkler heads in operation.

Also in certain applications where a sprinkler system is not provided in a building but a fire control system utilizing fire hoses located at selected locations in the building and where the fire control system includes an inlet connection external of the building so that fire suppression personnel can connect an auxiliary fire water supply to the system.

Accordingly, the National Fire Protection Association Code Section 207.1 requires a connection through which a fire department can pump water into the sprinkler system or fire control system except where permission of an appropriate local jurisdiction has been secured to eliminate the connections. Where such connections are provided, upon arrival of fire suppression personnel an auxiliary source of water supply, usually a hose supplied with water from a fire hydrant, is connected to the connection where the connection is advantageously located outside the building and in most instances in a public location accessable to vandals or subject to inadvertent damage. In most cases, a hose connection including a union with a union nut is the connection provided and National Fire Protection Association Code Section 2-7.6.2 specifies that such hose connections shall be equipped with plugs or caps.

The plugs or caps are provided to be attached to the union nut to cover the auxiliary water inlet to the sprinkler system to prevent vandalism and inadvertant introduction of trash or other debris to the water inlet which would clog the sprinkler system when it is needed most.

Such hose connections are usually called siamese connections and are fitted with union nuts having an internal thread to match the thread of the hose of the local fire department, in most cases a male connection of a fire hose. Also, in most instances, the union nut is loosely retained on the inlet pipe and is provided with radially extending parts adapted to be operated by a "spanner" wrench carried by most firefighters.

Several types of caps or plugs have heretofore been provided to be secured to the union nut of siamese connections to protect the integrity and operability of the system to supply water to the sprinkler system. One such cover is a brass plug having external threads to be received in the union nut where the plug, like the union nut, is provided with radially extending posts to be operated by a spanner wrench.

The union nut of such siamese connections is usually brass so it is necessary to provide brass plugs, which are of substantial scrap value so that, because of their location in public places, the plugs are frequently stolen.

An alternative arrangement which has been provided includes an easily breakable, for example cast iron cap which is attached to the union nut, for example by U-bolts carried by the cap but adapted to engage the posts of the union nut to hold the cap in place. Such cap members have been particularly vulnerable to vandalism and are particularly susceptible to breakage at the points where the U-bolts are received in the cap. Furthermore, even where the cap is not broken, certain portions of the cap are necessarily there and over a period of time rust through and the caps fall off. Also, because of the differences in coefficient of thermal expansion between the union nut and cap the cap is also susceptible to breakage.

Accordingly, it is desireable to provide a cover means for an outside sprinkler system which can be quickly and easily removed by a firefighter upon arrival at the scene of a fire so that a hose can be connected to the sprinkler system where the cap is not otherwise easily removed either intentionally or accidentally or likely to break away as a result of thermal or atmospheric conditions.

SUMMARY OF THE INVENTION

The present invention provides a cap arrangement which is virtually tamperproof, cannot be removed without destruction thereof but is not susceptable to inadvertant breakage but is easily removed at the appropriate time.

Furthermore the present invention provides straightforward cap design which is easily and economically fabricated, and is easily attached to a fire sprinkler system, and not susceptable to breakage from corrosion or changes in atmospheric conditions.

More particularly, the present invention provides a security cap to be attached to a union nut of a piping union where the union nut is provided with at least one radially outwardly extending post where the security cap includes: a cylinder of selected wall thickness defining an internal chamber of selected diameter at least as great as the diameter of the union nut having an opening defined by an open end of the cylinder and adapted to receive the union nut where cover means are provided to cover the end of the cylinder opposite the open end; and, elongate grove means cut in the cylinder sidewall means extending from the open end of the cylinder and at an oblique angle relative to a line drawn parallel to the longitudinal axis of the cylinder where the grove is adapted to receive the union nut post to retain the union nut within the chamber defined by the cylinder; and, means to retain the union nut within the cylinder.

Various other features of the present invention will become obvious to those skilled in the art upon reading the disclosure set forth hereinafter.

BRIEF DESCRIPTION OF THE DRAWINGS

Referring now to the drawings which illustrate one example of a device within the scope of the present invention:

FIG. 1 is a schematic illustration of an arrangement where a cap in accordance with the present invention can be used;

FIG. 2 is a perspective view of an example of a cap within the scope of the present invention; and, FIG. 3 is a perspective illustration of the orientation of the cap of FIG. 2 prior to attachment to a union nut.

Referring first to FIG. 1, showing a typical connection for auxiliary water supply to a sprinkler system, a pipe 1 extends through a wall 4 of a building in which a sprinkler system (not shown in full) is located where a cap 3 can be provided to be connected to cover a union nut 2 of an inlet to the sprinkler system as described hereinafter. Cap 3 can, for example, be located in a public area, for example, over a sidewalk 6. Pipe 1 is connected by means of elbows 7 and 9 an a connector pipe 8 to a check valve 11, which can be provided to prevent undesirable backflow of water from the sprinkler system to the street where a header 12 is provided from the outlet of checkvalve 11 and connected to the sprinkler system supply by connections not shown. In operation fire suppression, personnel arrive at the scene of the fire, remove cap 3 and attach a firehose (not shown) to union nut 2. In most cases, it is important that cap 3 be removed and the hose connected as quickly as possible. Water at a selected pressure in excess of the pressure in header inlet connector 12 is supplied through inlet 12 so the water is supplied to the sprinkler system to provide sufficient water for all of the sprinkler heads to operate at maximum efficiency.

As previously discussed, the present invention provides a cap arrangement for use with a union nut of the type shown in FIGS. 1 and 3, as union nut 2. Caps provided by the present invention can be provided to discourage tampering with the access part to building sprinkler systems yet, the present invention provides a cap which can be easily and quickly removed upon arrival of fire suppression personnel.

One example of a cap within the scope of the present invention is shown in FIGS. 2 and 3. Referring to the cap shown in FIG. 2, it has a cylindrical sidewall 5 with a blind end closure 17 closing one end of the cap cylinder 5 as shown. In the example shown, in FIGS. 2 and 3, slots 18 are cut inwardly and then parallel to an axis 19 intersecting at an obtuse angle relative to axis 21 drawn though the cylinder parallel to the longitudinal axis of the cylinder or, in an alternative arrangement, (not shown) the grooves can be cut in a modified helical pattern where, in any case, the width of slots 18 is adequate to receive posts 13 of union nut 2 for movement along the length thereof as described hereinafter. The shape of slot 18, within the scope of the present invention need only allow insertion of post 13 followed by rotation of the cap relative to the post for purposes described hereinafter.

Also, within the scope of the present invention, means can be provided to retain the cap on union nut 2 and in the example shown, holds 22, (in the example shown two elongate holes) provided are drilled from the outer face of blind cover 17, longitudinally through the walls of cylinder 5 to one side of slot 18 as shown. Advantageously, at least one of the holes 22 intersects the sidewall of slot 18 at a point behind innermost encroachment of the associated post into slot 18 as a pin can be inserted behind the post to retain the post in slot 18 as described hereinafter.

Also, in some arrangements within the scope of the present invention as shown in FIG. 2 holes 22, can be extended on the opposite side of slot 18 as holes 23 where, advantageously, holes 22 and 23 are in longitudinally aligned relation to receive the end of a pin mentioned hereinbefore and described hereinafter to retain posts 13 in slot 18.

Also as shown in FIGS. 2 and 3, a break away groove 27 can be provided to define a breakaway segment 10 where groove 27 can be, for example, coast or cut in this inside or outside of cylinder 5 to extend from the edge of slot 18 to the open end of cylinder 5, as shown. Advantageously, as described hereinafter, the cap is formed of a friable material, for example, grey or cast iron or bakelite, and groove 27 provides a weak point to facilitate breaking off segment 10 for release of the cap as described hereinafter in detail.

Referring again to FIG. 2, a spacer ring 28, for example, of a resilient material such as rubber, can be provided to be recieved against the inside of endwall 17 and rest against the inner wall of cylinder 5, to cushion the end of endwall 17 as described hereinafter.

Referring now to FIG. 3 which illustrates one connecting arrangement within the scope of the present invention, a cap 16 of the same configuration as shown in FIG. 2 is provided to be connected to a union nut 2 as in an arrangement shown in FIG. 1, where union nut 2 is freely rotatable on a connector 1 to supply water to a header 12 and where connector 1 is provided with a lip 14 extending radially outwardly from connector 1 to engage the inner rear surface of union nut 1 (not shown), as is known in the art, to retain union nut 2 on connector 1 and provide a seal therebetween where union nut 1 is connected to a cooperative fitting, for example, the end of a hose. In this regard, the inner cylindrical surface of union nut 1 can be threaded or otherwise suitably adapted, to receive such a fitting.

In this arrangement shown, union nut 2 is provided with radially outwardly extending posts 13 adapted to be received in slots 18 of cap 16. To attach cap 16 to union nut 2, post 13 shown, as well as a diametrically or otherwise located post 13 is inserted into the open ends of the cooperative grooves 18 of cap 16, the cap is rotated relative to the union nut so that post 13 progress in grooves 18 as far as possible.

In one arrangement in accordance with the present invention ring 28 as described with reference to FIG. 2 can be provided so that front face 2A of union nut 2 engages ring 28, which can be resilient and post 13 can be urged into slot 18 to slightly compress ring 28. In this position, a portion of the force of a blow struck on cloud end 17 of cap 16 can be absorbed by ring 28 to reduce the likelihood of unworked breakage of cap 16.

When cap 16 has been rotated sufficiently to draw post 13 as far as reasonably possible into slot 18 pins 24 can be inserted into one of the holes 22 just behind post 13 to retain the post within slot 18. Pins 24 can advantageously, have a principal diameter less than the diameter of holes 22 and can be long enough to extend the entire depth of holes 22, across the width of slot 18 and into a hole 23 is also greater than the principal diameter of pin 24 so the outer end of pin 22 is not tightly engaged in a hole 23. In some arrangements, pin 24 can be provided with a widened end 26, where the maximum width of end 26 is greater than the diameter of holes 22 so when pin 24 is inserted into hole 22 so that the end is flush with the outer surface of end 17 of cap 16 the extremities of widened end 24 engage the sides of holes 22 to prevent unwanted removal of pin 24 so cap 16 is fixed on union nut 2, in some cases with face 2A of union nut 2 partially compressing ring 28. Also, advantageously, the innermost ends of pin 24 can be loosely received in holes 23.

In the event of fire or other occurrence where it is necessary to quickly remove cap 16, fire suppression personnel can quickly remove cap 16 by a sharp blow to breakaway segment 10 which is easily removed because it breaks at groove 27. Since the innermost end of pin 24 is not tightly engaged in hole 23, the breakaway segment falls free, thereby, releasing cap 16 from post 13 to allow removal of cap 16, freeing union nut 2 for connection to a cooperative fitting, for example, a water supply hose.

It is to be recognized that various alter arrangements, also within the scope of the present invention, will occur to those skilled in the art upon reading the disclosure set forth hereinbefore.

The invention claimed is:

1. A security cap to be attached to a union nut of a piping union where the union nut is provided with at least one radially outwardly extending post means where the cap includes:
   (a) A cylinder of friable material of selected wall thickness and length along the longitudinal axis thereof, defining an internal chamber of selected diameter at least as great as the maximum outer diameter of the union nut, where one open end of said cylinder is adapted to receive said union nut elongate slot means having a width adapted to receive the post means of said union nut being cut through the sidewall of the cylinder means, said slot means having an open end at said open end of said cylinder means, and wherein said slot means extends longitudinally of said cylinder as well as in a direction parallel to a line obliquely intersecting a line drawn through said cylinder parallel to the longitudinal axis thereof;
   (b) Cover means to substantially cover the end of said cylinder opposite said open end; and
   (c) Pin means with cooperative pin receiving means carried by said cylinder means to retain said post means within said slot means.

2. The invention of claim 1 wherein said slot means progresses in the wall of said cylinder from said open end first longitudinally for a selected distance along the length of said cylinder then in a direction parallel to a line drawn through the sidewall of said cylinder to obliquely intersect a line drawn through the sidewall of said cylinder parallel to the longitudinal axis of the cylinder.

3. The invention of claim 1 wherein said slot means progresses in a helical path from the open end of said cylinder along a portion of the longitudinal axis of said cylinder.

4. The invention of claim 1 wherein said means to retain said post means within said slot means includes:
   (a) hole means having a selected diameter and drilled through the sidewall of said cylinder from the end of the cylinder having the cover means to intersect said slot means at a selected position along the length thereof where said post means can be received in said slot means between the point of intersection of the hole in the slot means and the end of the slot means; and
   (b) elongate pin means having a principal diameter less than the diameter of said holes to be inserted into said hole means to extend into said slot means to retain said post means between said pin means and into end of said slot means.

5. The invention of claim 4 wherein said hole means extend across said slot means and a second portion of said hole is drilled into the portion of said cylinder sidewall on the side of said slot opposite said closed end and wherein said pin means extends entirely across the width of said slot means and into the second portion of said hole to securely retain said post means in said slot.

6. The invention of claim 4 wherein said pin means include an expanded portion wider than the diameter of the hole adjacent to the end of the pin last received in the hole to secure the pin in the hole.

7. The invention of claim 1 including groove means cut into a surface of said cylinder to a selected depth and extending generally between the closed end of said slot and the open end of said slot and the open end of said cylinder.

8. The invention of claim 1 including resilient pad means to be retained between the forwardmost portion of said union nut received in said chamber defined by said cylinder and the inner surface of said cover mean.

* * * * *